United States Patent [19]

Smith et al.

[11] Patent Number: 5,297,716
[45] Date of Patent: Mar. 29, 1994

[54] SOLDERING TOOL WITH ATTACHED THERMOCOUPLE

[75] Inventors: Tyler W. Smith, Stephenson County; Thomas A. Young, Carroll County, both of Ill.

[73] Assignee: Honeywell Inc., Minneapolis, Minn.

[21] Appl. No.: 45,956

[22] Filed: Apr. 12, 1993

[51] Int. Cl.$^5$ .............................................. B23K 3/02
[52] U.S. Cl. .................................... 228/8; 228/51; 219/241; 219/494; 136/221; 136/235
[58] Field of Search ............... 228/8, 51, 55; 219/233, 219/241, 494; 136/221, 235; 374/179

[56] References Cited

U.S. PATENT DOCUMENTS

| | | | |
|---|---|---|---|
| 3,980,861 | 9/1976 | Fukunaga | 228/51 |
| 4,588,307 | 5/1986 | Palti | 136/230 |
| 4,654,507 | 3/1987 | Hubbard et al. | 219/233 |
| 4,878,016 | 10/1989 | Wahl et al. | 374/142 |

*Primary Examiner*—Samuel M. Heinrich
*Attorney, Agent, or Firm*—William D. Lanyi

[57] ABSTRACT

A soldering tip is provided with a protrusion extending from its operative region to permit an opening to extend therethrough. Thermocouple wires are disposed in the opening and mechanically urged into thermal contact with the operative region. One embodiment of the present invention provides a protrusion extending from the central region of the soldering tip which is deformed by compression after thermocouple wires are inserted into an opening extending through the protrusion. An alternative embodiment of the present invention incorporates two protrusions to define a gap therebetween into which the thermocouple wires can be disposed. After disposing the wires in the gap, an annular member is placed around both protrusions and a spring urges the annular member downward to press the thermocouple against the bottom of the gap and in thermal contact with the central region of the soldering tip.

12 Claims, 4 Drawing Sheets

SOLDERING TOOL WITH ATTACHED THERMOCOUPLE

BACKGROUND OF THE INVENTION

1. Field of the Invention

The present invention relates generally to a soldering tool and, more particularly, to a soldering tool which attaches a thermocouple to a central region of a soldering tip by compressive force.

2. Description of the Prior Art

Many different types of soldering tools are known to those skilled in the art. As will be described in greater detail below, soldering tips are available in commercial quantities from Hughes Industrial Products Division and Unitek Equipment Division of the Weldmatic Corporation.

In order to be useable with automatic soldering equipment which regulates the temperature of the soldering tip, some means must be provided to permit the measurement of the temperature at the operative tip of the soldering tool so that the temperature can be properly regulated by the automatic soldering equipment. In soldering tips known to those skilled in the art, the thermocouple is attached to the operative region of the soldering tip in several different ways. First, the thermocouple can be bonded to the operative region by a globule of meltable material, such as a nickel, copper, chromium alloy, thereby physically encapsulating the operative end of the thermocouple wires within the globule and attaching the thermocouple to the soldering tip. Another means for attaching the thermocouple to the soldering tip utilizes a small strap of nickel material and attaches the strap to the operative region of the soldering tip with miniature spot welds. The strap maintains the thermocouple in thermal contact with the operative region. These known techniques for attaching thermocouples to soldering tips create several problems in their manufacture and use. For example, the manufacture of soldering tools using these techniques is both time consuming and expensive. In addition, these techniques result in failure of the soldering tip after an unacceptably small number of repetitive uses in soldering operations. It would therefore be beneficial if a soldering tip could be constructed in a way which permits its inexpensive manufacture and results in a sturdy device that permits a higher number of operations before failure and the need to replace the tip.

SUMMARY OF THE INVENTION

A preferred embodiment of the present invention provides a soldering tool which comprises an electric current conducting member which is shaped to form a generally U-shaped configuration having first and second generally parallel legs which are connectable to a power supply. A central region of the current conducting member has a cross sectional area which is less than that of the first and second generally parallel legs. Although some embodiments of the present invention comprise first and second legs which are generally equal in cross sectional area to the central region in some portions of the legs, the predominate portions of the first and second legs comprise larger cross sectional area so that a flow of electrical current from a first leg to a second leg causes the central region to rise in temperature above that of the legs. The present invention also comprises a protrusion extending from the central region wherein the protrusion has an opening extending therethrough. A pair of wires are disposed in electrical communication with each other to form a thermocouple and the thermocouple is disposed in the opening of the protrusion. In addition, the present invention provides a means for entrapping and pressing the pair of wires into intimate thermal contact with the central region of the solder tool.

When the pair of wires is disposed in the opening of the protrusion, one embodiment of the present invention deforms the protrusion to capture the pair of wires within the opening. An alternative embodiment of the present invention provides a pair of protrusions extending from the central region to define a gap therebetween and the pair of wires is disposed within the gap and pressed against the central region by a force provided by a spring and a small annular washer. The spring force is exerted in a direction which compresses the pair of wires between the small washer and the central region of the soldering tool. Another alternative embodiment of the present invention comprises a protrusion with two holes extending therethrough. Each of the pair of wires is extended through one of the holes and the ends of the wires are fused together to form a thermocouple arrangement.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 1:
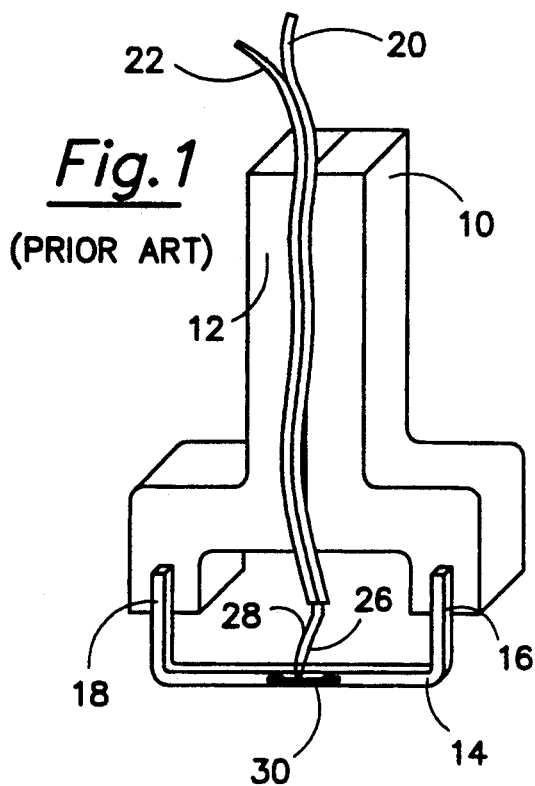
FIG. 1 illustrates one type of soldering tip that is known to those skilled in the art.

Throughout the Description of the Preferred Embodiment, like reference numerals will be used to identify like components.

Figure 2:
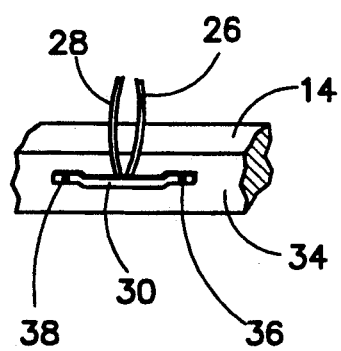
FIG. 2 is an enlarged view of a portion of the known soldering tip shown in FIG. 1.

As discussed above, numerous types of soldering tips are known to those skilled in the art. FIGS. 1 and 2 illustrate the technique used to provide one type of soldering tip which is available in commercial quantities from the Hughes Industrial Products Division. It comprises first and second generally rigid arms identified by reference numerals 10 and 12. A thinner operative member 14 is welded to the arms at the positions identified by reference numerals 16 and 18. The two rigid arms, 10 and 12, are electrically insulated from each other and connectable across a voltage source of a power supply. As current flows through the first arm 10, it passes through the operative member 14 and then flows back to the power supply through the second arm 12. Since the operative arm 14 comprises a thinner cross sectional area than either of the two generally rigid arms, 10 and 12, it rises in temperature, because of the electrical current passing through it, at a more significant rate than either of the two arms. The operative member 14 is selectively disposed in physical contact with a component which is to be soldered In order to control the temperature of the operative member 14, a thermocouple is attached thereto. Two shielded wires, 20 and 22, are arranged as shown in FIG. 1. A portion of the wires is stripped of its insulation and the two bare wires, 26 and 28, are fused together to form a thermocouple arrangement. In order to hold the thermocouple in good thermal contact with the operative member 14, a small strap 30 is spot welded to the operative member. FIG. 2 is an enlarged view of the middle portion of the operative member 14, showing the two wires, 26 and 28, extending to a portion of the operative member 14 where the strap 30 is disposed over them, holding the ends of both wires in thermal contact with a surface 34 of the operative member 14. The strap 30 is spot welded, at locations 36 and 38, to the surface 34 while the ends of wires 26 and 28 are disposed between the strap 30 and surface 34. This technique holds the ends of the thermocouple wires against surface 34 so that the thermocouple can accurately measure the temperature of operative member 14.

Figure 3A:
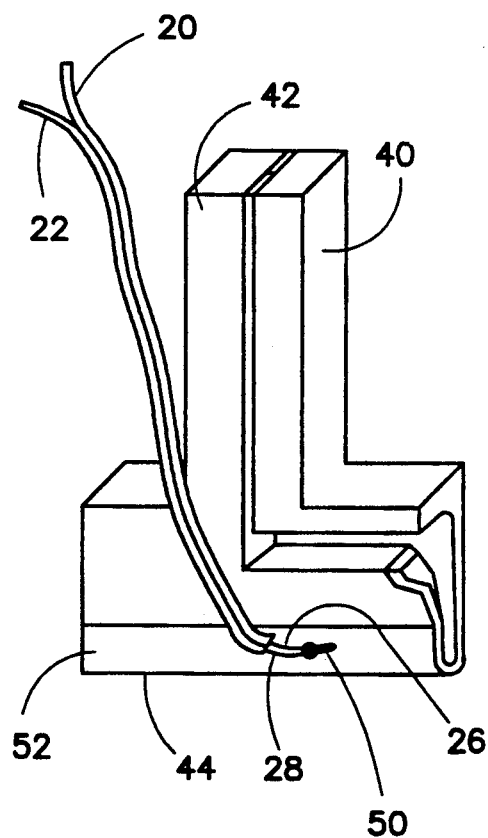
FIG. 3A shows another known type of soldering tip.

FIG. 3A shows an alternative type of soldering tip which is available in commercial quantities from the Hughes Industrial Products Division. Two arms, 40 and 42, extend downward from points which they are connectable in electrical communication with the power supply and are insulated from each other except where they meet at an operative edge 44. Current flows downward from a power supply through arm 40 and toward the operative edge 44 from which it flows back toward the power supply through arm 42. In a manner generally similar to that described above in conjunction with FIGS. 1 and 2, a pair of thermocouple wires, 20 and 22, are extended from the control circuitry of a soldering apparatus toward the operative edge 44. The insulation is stripped from a portion of the wires, identified by reference numerals 26 and 28, and the two wires are attached together to form a thermocouple arrangement. In the apparatus shown in FIG. 3A, the ends of the wires are attached to a region proximate the operative edge 44 by disposing a globule 50 of meltable material, such as a nickel, copper, chromium alloy, over the end of the thermocouple wires and encapsulating them therein. The meltable material of globule 50 adheres to the surface 52 of the device and holds the encapsulated thermocouple in good thermal contact with a region of the soldering tip proximate the operative edge 44.

Figure 3B:
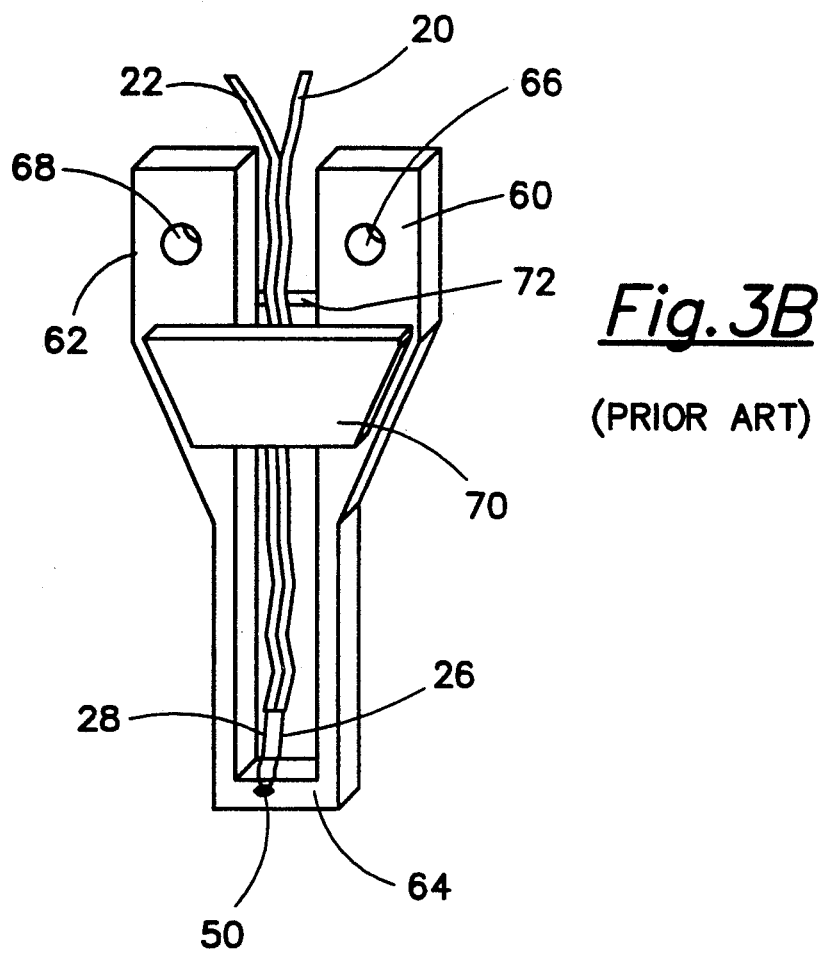
FIG. 3B shows yet another type of known soldering tip.

FIG. 3B shows another known technique for providing a soldering tip. A single piece of material is shaped to provide a first leg 60 and a second leg 62. The generally U-shaped conductor also comprises a central region 64 which is disposed in a generally perpendicular association with the first and second legs, 60 and 62. The legs are provided with holes, 66 and 68, which facilitate the connection of the device to the power supply of an automatic soldering apparatus. Current is caused to flow to the first leg 60 in a direction toward the central region 64 from which it continues to flow to the second leg 62 and back to a power supply connected thereto. Heat is generated at the central region 64 which is disposed in contact with an object to be soldered. In a manner generally similar to that described above in conjunction with FIGS. 1, 2 and 3A, a pair of wires is extended from a control circuit to the central region 64. Those wires, 20 and 22, extend toward the central region 64 and the insulation is stripped from a portion of the wires to expose wires 26 and 28 in the same manner as described above. A globule 50 of meltable material, such as a nickel, copper, chromium alloy, is disposed on the central region 64 to encapsulate the ends of the thermocouple wires and attach the thermocouple in good thermal contact with the central region 64. An electrically insulative brace 70 is attached to both legs, 60 and 62, to maintain the rigidity of the assembly shown in FIG. 4. A similarly constructed brace 72 is disposed on the opposite side of the legs to cooperate with brace 70 in performing this function.

Figure 4:
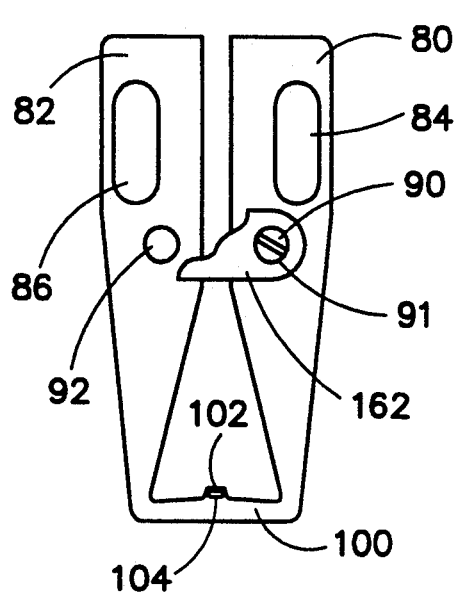
FIG. 4 illustrates one embodiment of the present invention.

FIG. 4 illustrates one preferred embodiment of the present invention. It comprises a current conducting member which is shaped to form a generally U-shaped configuration having a first leg 80 and a second leg 82 which are generally parallel to each other. The first and second legs are connectable to a power supply through the use of elongated openings 84 and 86. In addition, the legs are provided with openings, 90 and 92, to permit the attachment of a brace in a manner similar to that described above in conjunction with the braces, 70 and 72, shown in FIG. 3B. The first and second legs are connected at a central region 100 which is formed to have a cross sectional area that is less than the predominate portions of the first and second legs to assure an increase in temperature of the central region 100 in response to an electrical current flowing through the first and second legs. A protrusion 102 extends from the central region and is provided with a central opening 104 extending therethrough.

Figure 5:
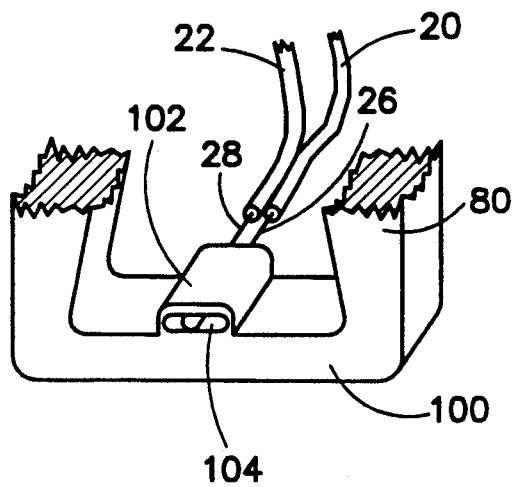
FIG. 5 is an enlarged illustration of the central region of one embodiment of the present invention shown in FIG. 4.

FIG. 5 illustrates an enlarged view of the central region 100, the protrusion 102 and opening 104. As described above, the central region 100 is an integral portion of the current conducting member and, as such, is connected to the first and second legs, 80 and 82. In the particular embodiment illustrated in FIG. 5, the opening 104 is a single hole which extends through protrusion 102 as shown. A pair of wires, 20 and 22, are extended toward opening 104 and a portion of the wires is stripped of insulation to expose bare wires 26 and 28. In a manner well known to those skilled in the art, the bare wires, 26 and 28, are fused together to form a thermocouple apparatus. The wires are disposed within opening 104 as shown. After disposing the wires within opening 104, protrusion 102 is deformed to permanently capture the thermocouple within opening 104. It should be understood that the fusing of the bare wires, 26 and 28, prior to deformation of protrusion 102 is not an absolute necessity of the present invention. Instead, the two wires can be disposed within opening 102 and the compression, or deformation, of protrusion 102 can be sufficient to force the two wires together to form the thermocouple as a result of the deformation and coincident compression of the wires together.

Figure 6A:
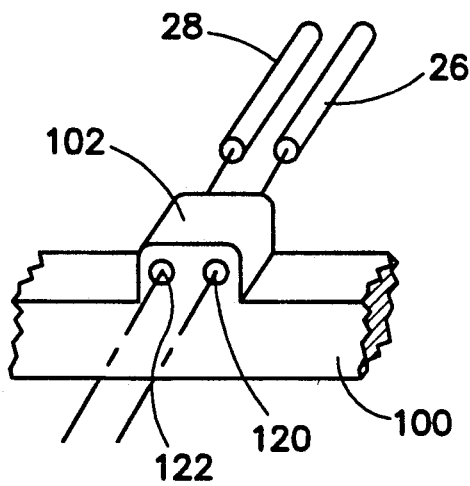
FIGS. 6A, 6B and 6C show sequential steps of forming an alternative embodiment of the present invention.
Figure 6C:
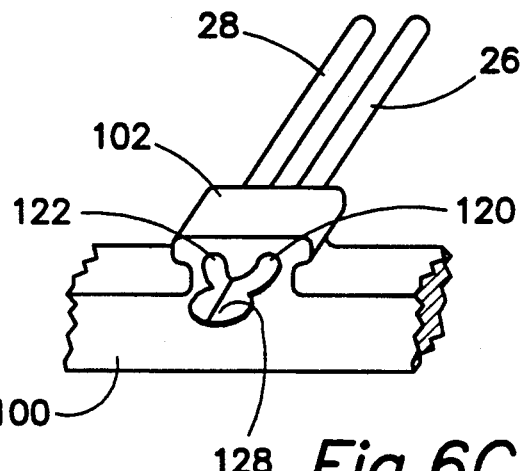
Figure 6B:
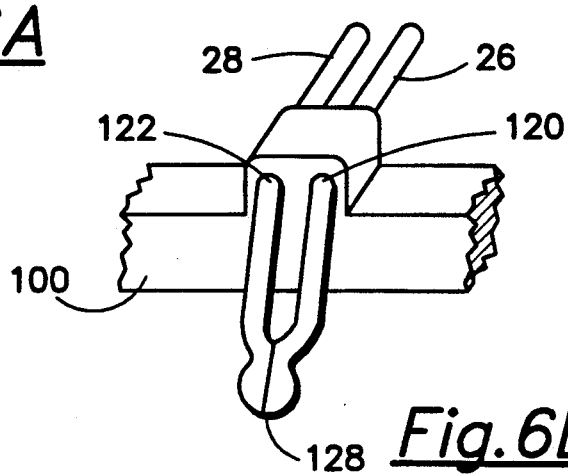

An alternative embodiment of the present invention is shown in FIGS. 6A, 6B and 6C. FIG. 6A shows the central region 100 of the present invention with its protrusion 102 extending therefrom. However, instead of a single opening 104, two holes, 120 and 122, are provided. Each of the two holes, 120 and 122, are shaped to receive individual wires, 26 and 28, therethrough in clearance relation. After the two wires, 26 and 28, are extended through the holes, 120 and 122, they are fused to form a thermocouple. This is shown in FIG. 6B. The fused ends of wires 26 and 28 form a thermocouple arrangement 128. After the fusing of the two wires, they can be drawn back toward the protrusion 102 as shown in FIG. 6C. After the thermocouple arrangement 128 is caused to move back toward protrusion 102, the protrusion 102 can be deformed as shown in FIG. 6C to permanently capture the wires in holes 120 and 122.

With reference to FIGS. 5, 6A, 6B and 6C, it can be seen that in the alternative embodiments of the present invention no globule is used to attach the thermocouple to the operative portion of the soldering tip, such as central region 100. Instead, the thermocouple is connected to the central region 100 by deforming protrusion 102.

Figure 7:
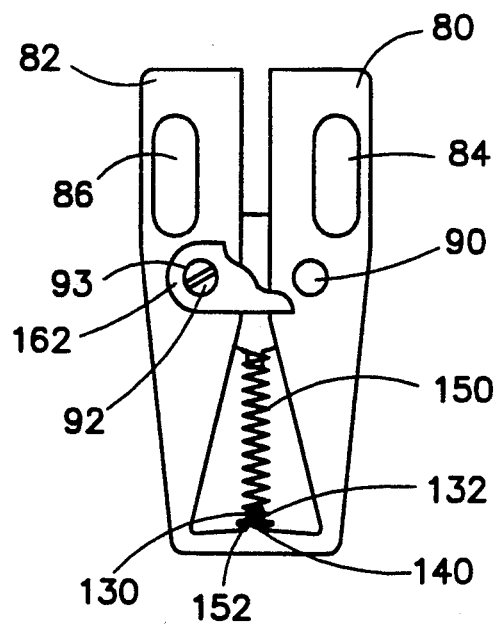
FIG. 7 is an illustration of an alternative embodiment of the present invention.

FIG. 7 illustrates an alternative embodiment of the present invention. Most of the portions of the device illustrated in FIG. 7 are identical to those shown in FIG. 4. However, instead of the protrusion 102, as illustrated in FIGS. 4, 5, 6A, 6B and 6C, a pair of protrusions, 130 and 132, are formed as extensions from the central region 100. The two protrusions, 130 and 132, are shaped to define a gap 140 therebetween. The gap 140 is shaped to receive a pair of thermocouple wires within it. A spring 150 and a small annular member 152 are used to hold the wires within gap 140 and in good thermal contact with the central region 100.

Figure 8:
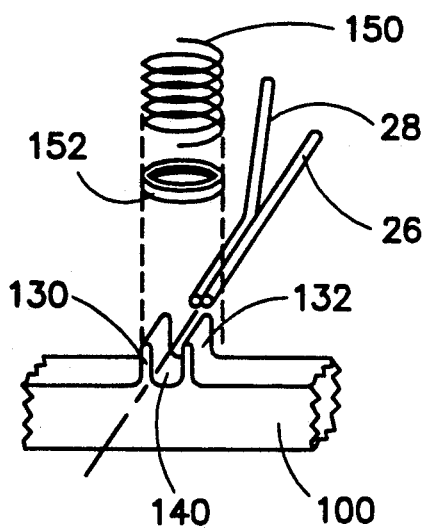
FIG. 8 is an enlarged view of a portion of the embodiment illustrated in FIG. 7.

FIG. 8 shows an enlarged view of the central region 100 and protrusions 130 and 132. The bare wires, 26 and 28, are fused together to define a thermocouple apparatus and the thermocouple is disposed is gap 140. The small annular member 152 is disposed around both protrusions, 130 and 132, and above the thermocouple arrangement in gap 140. Spring 150 exerts a downward force against the annular component 152 and against the thermocouple. This urges the thermocouple into intimate thermal contact with the central region 100.

With reference to FIGS. 4 and 7, a preferred embodiment of the present invention comprises a current conducting member which has first and second legs, 80 and 82, and a central region 100. In a particularly preferred embodiment of the present invention, the current conducting member is made of molybdenum which is formed by laser cutting the shape shown in FIGS. 4 and 7 from a sheet of molybdenum. The current conducting member is approximately 0.060 inches thick and the total length of the first and second legs is approximately 1.590 inches. The central region 100 is formed to have a length, between its points of contact with the legs, which is suitable for the particular soldering application of its intended use. The width of the soldering tip, measured from the outside edge of the first leg 80 to the outside edge of the second leg 82, is approximately 0.800 inches. The slots, 84 and 86, are approximately 0.156 inches wide and have an operative length of approximately 0.300 inches. The holes, 90 and 92, have diameters of approximately 0.160 inches. The protrusion 102, in the embodiment shown in FIGS. 4 and 5 have an opening that is approximately 0.026 inches measured in the direction parallel to the longest dimension of the central region 100. An insulating brace 162, is approximately 0.030 inches thick, approximately 0.300 inches wide and approximately 0.605 inches long with holes formed therein to align with holes 90 and 92.

In order to insulate bolts, 91 and 93, from the first and second legs, small circular washers 160 are made of an insulative material and disposed within holes 90 and 92. The outside diameter of the insulators disposed in the holes is approximately 0.157 inches and inside diameters of those insulative members are approximately 0.115 inches.

Figure 9:
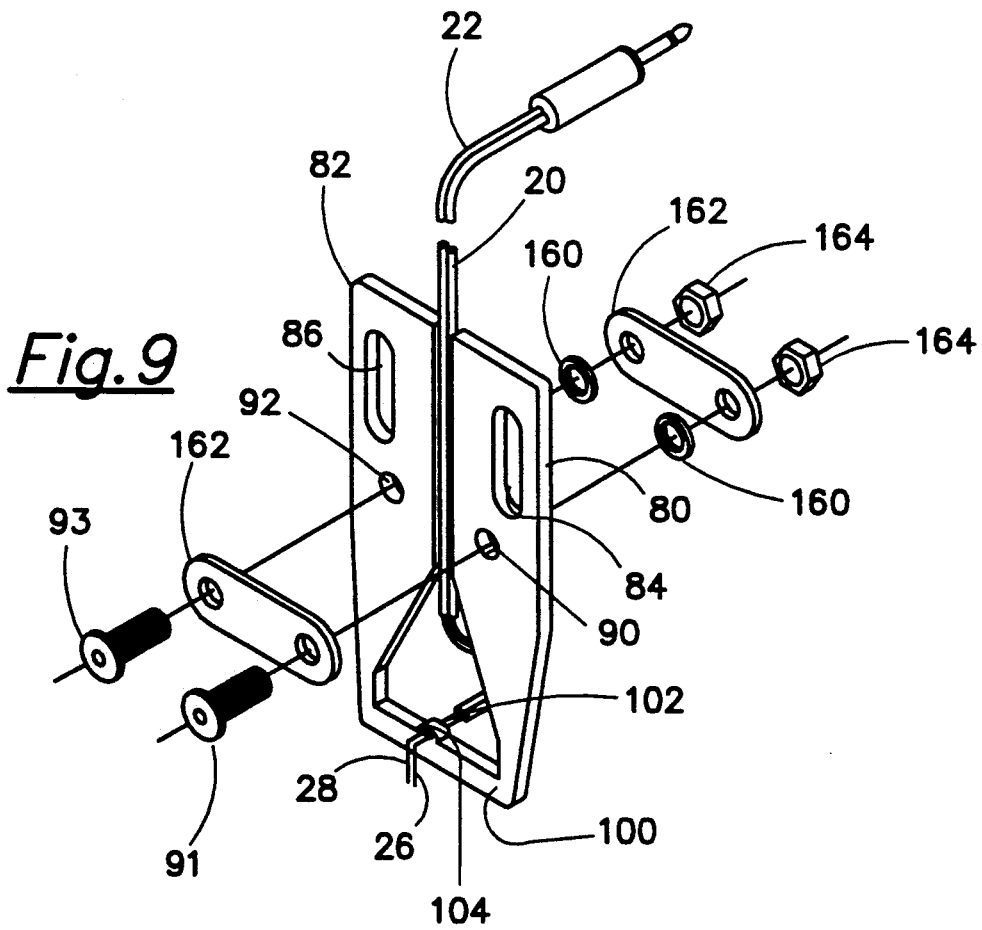
FIG. 9 illustrates an exploded view of one embodiment of the present invention.

FIG. 9 is an exploded view of one embodiment of the present invention. The first leg 80 and the second leg 82 are provided with openings, 90 and 92, respectively. The openings are shaped to receive insulators 160 therein. The insulators are shaped to receive bolts, 91 and 93, which also extend through insulators 162. Nuts 164 attach these components together.

Figure 10:
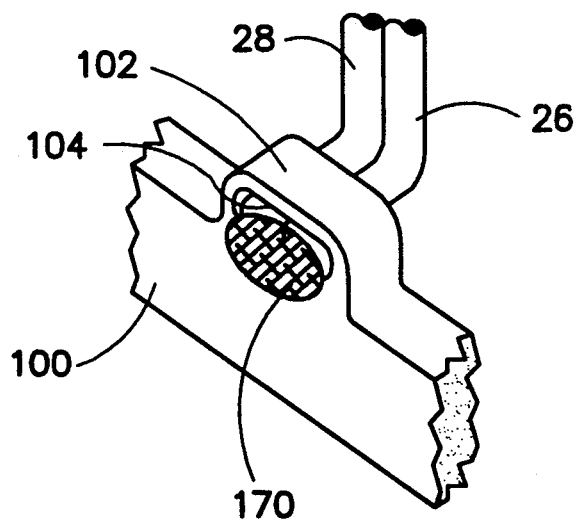
FIG. 10 is a section of one particular embodiment of the present invention.

FIG. 10 shows an alternative configuration of the present invention. Wires 26 and 28 are extended through opening 104 and melted together, as identified by reference numeral 170, either within opening 104 or adjacent to it. The wires may fuse to the central region 100 during this process, but this bonding is not a requirement of the present invention.

As described above, the present invention provides a soldering tip which is approximately 80% less expensive to manufacture than soldering tips presently known to those skilled in the art. In addition, the connection of the thermocouple to the central region of the soldering tip is made without the need for using meltable materials. Soldering tips made in accordance with the present invention are significantly less expensive to manufacture than the known soldering tips described above. Initial studies indicate that the cost of a soldering tip made in accordance with the present invention is less than 20% of the cost of commercially available soldering tips. In addition, initial empirical tests indicate that the increased ruggedness of the present invention increases the number of soldering operations that the tip is capable of performing. This results in a cost per operation significantly less than that which is available commercially at the present time. Although these figures are empirically derived and depend on the particular details in manufacture and use, it should be understood that the cost to manufacture products soldered by the present invention is significantly lower than it would be if commercially available soldering tips are used.

The present invention achieves these advantages by providing a soldering tip which attaches a thermocouple to a central region of the tip through compressive force in order to eliminate the need for complicated manufacturing assembly techniques, such as the attachment of a miniature strap or the use of a meltable material to form a globule of that material to encapsulate the thermocouple and attach it to the operative region of the soldering tip.

Although the present invention has been described in significant detail and illustrated with particular specificity to show its several preferred embodiments, it should be clearly understood that alternative embodiments are within its scope.

The embodiments of the invention in which an exclusive property or right is claimed are defined as follows:
 1. A soldering tool, comprising:
  a current conducting member shaped to form a generally U-shaped configuration having first and second generally parallel legs which are connectable to a power supply and a central region having a cross sectional area which is less than that of said first and second generally parallel legs;

a protrusion extending from said central region, said protrusion having an opening extending therethrough;

a pair of wires disposed in electrical communication with each other to form a thermocouple, said pair of wires being disposed in said opening of said protrusion; and means for pressing said pair of wires into intimate thermal contact with said central region.

2. The tool of claim 1, wherein:

said protrusion is deformed to capture said pair of wires within said opening.

3. The tool of claim 1, wherein:

said protrusion comprises a pair of extensions and said pair of wires is disposed between said pair of extensions.

4. The tool of claim 3, further comprising:

a spring which urges said pair of wires toward the central region between said pair of extensions.

5. A soldering tool, comprising:

an electrically conductive member shaped to form a generally U-shaped configuration with two generally parallel legs and a central region disposed perpendicularly to said legs, said central region having a cross sectional area which is less than that of said legs;

an opening formed through a portion of said central region;

a pair of thermocouple wires disposed in said opening; and means for urging said pair of thermocouple wires into thermal contact with said central region.

6. The tool of claim 5, wherein:

said opening is formed in a protrusion extending from said central region.

7. The tool of claim 6, wherein:

said protrusion is deformed to provide said urging means.

8. The tool of claim 6, wherein:

said opening comprises two holes extending through said protrusion with one of said pair of thermocouple wires disposed on one hole and the other one of said pair of thermocouple wires disposed in the other hole.

9. The tool of claim 5, wherein:

said opening is formed between two protrusions extending from said central region.

10. The tool of claim 9, wherein:

said urging means comprises a spring disposed in contact with a washer, said washer being disposed in contact with said pair of thermocouple wires.

11. The tool of claim 5, wherein:

said legs comprise holes therethrough for connecting said legs to a power supply.

12. The tool of claim 5, further comprising:

an insulative brace connected between said legs.

* * * * *